US012198215B2

United States Patent
Gupta et al.

(10) Patent No.: US 12,198,215 B2
(45) Date of Patent: Jan. 14, 2025

(54) SELF-SOVEREIGN IDENTITY SYSTEMS AND METHODS FOR IDENTIFICATION DOCUMENTS

(71) Applicant: Mitek Systems, Inc., San Diego, CA (US)

(72) Inventors: Sanjay Gupta, Del Mar, CA (US); Michael Ramsbacker, Cardiff, CA (US); Stephen Ritter, Solana Beach, CA (US); James Treitler, San Diego, CA (US); Ashok Singal, San Diego, CA (US); Jason L. Gray, La Jolla, CA (US); Michael Hagen, Los Altos, CA (US)

(73) Assignee: Mitek Systems, Inc., San Diego, CA (US)

( * ) Notice: Subject to any disclaimer, the term of this patent is extended or adjusted under 35 U.S.C. 154(b) by 457 days.

(21) Appl. No.: 16/917,776

(22) Filed: Jun. 30, 2020

(65) Prior Publication Data

US 2020/0334430 A1  Oct. 22, 2020

Related U.S. Application Data

(63) Continuation-in-part of application No. 16/529,293, filed on Aug. 1, 2019, now Pat. No. 10,747,971, (Continued)

(51) Int. Cl.
*G06Q 50/26* (2024.01)
*G06K 7/10* (2006.01)
(Continued)

(52) U.S. Cl.
CPC ....... *G06Q 50/265* (2013.01); *G06K 7/10009* (2013.01); *G06K 7/10386* (2013.01); (Continued)

(58) Field of Classification Search
None
See application file for complete search history.

(56) References Cited

U.S. PATENT DOCUMENTS

| 5,881,172 A | 3/1999 | Pintsov |
| 7,168,614 B2 | 1/2007 | Kotovich et al. |

(Continued)

FOREIGN PATENT DOCUMENTS

| EP | 1646966 A2 | 4/2006 |
| EP | 1677231 A1 | 7/2006 |

(Continued)

OTHER PUBLICATIONS

"Machine Readable Travel Documents Part 11, Security Mechanishs for MRTDS", Doc 9303, International Civil Aviation Organization, Seventh Edition, 2015, 112 pages.

(Continued)

*Primary Examiner* — Steven S Kim
*Assistant Examiner* — Jason B Fenstermacher
(74) *Attorney, Agent, or Firm* — Carr & Ferrell LLP (57) ABSTRACT

Self-sovereign identity systems and methods for identification documents are disclosed herein. An example method includes transmitting data obtained from a near-field communications (NFC) chip of an object to the service provider. The data can include identifying information for an owner of the object. The method can include receiving a user identity packet from the service provider that is generated by the service provider based on verification of an identity of the owner and validity of the NFC chip, storing the user identity packet on a computing device, receiving a request from a first requesting device or service for the data stored on the NFC chip of the object and transmitting the user identity packet from the computing device to the first requesting device or service instead of the data.

17 Claims, 8 Drawing Sheets

Related U.S. Application Data which is a continuation of application No. 15/604,372, filed on May 24, 2017, now Pat. No. 10,372,950, which is a continuation of application No. 14/722,058, filed on May 26, 2015, now Pat. No. 9,665,754.

(60) Provisional application No. 62/004,101, filed on May 28, 2014.

(51) Int. Cl.
  *G06Q 10/10* (2023.01)
  *G06Q 50/00* (2012.01)
  *H04W 4/80* (2018.01)
  *H04W 12/00* (2021.01)

(52) U.S. Cl.
  CPC ............ *G06Q 10/10* (2013.01); *G06Q 50/00* (2013.01); *H04W 4/80* (2018.02); *H04W 12/00* (2013.01); *G06Q 2220/00* (2013.01)

(56) References Cited

U.S. PATENT DOCUMENTS

| | | | |
|---|---|---|---|
| 7,201,323 | B2 | 4/2007 | Kotovich et al. |
| 7,249,717 | B2 | 7/2007 | Kotovich et al. |
| 7,430,310 | B2 | 9/2008 | Kotovich et al. |
| 7,657,091 | B2 | 2/2010 | Postnikov et al. |
| 7,778,457 | B2 | 8/2010 | Nepomniachtchi et al. |
| 7,787,695 | B2 | 8/2010 | Nepomniachtchi et al. |
| 7,949,176 | B2 | 5/2011 | Nepomniachtchi |
| 7,953,268 | B2 | 5/2011 | Nepomniachtchi |
| 7,978,900 | B2 | 7/2011 | Nepomniachtchi et al. |
| 8,000,514 | B2 | 8/2011 | Nepomniachtchi et al. |
| 8,326,015 | B2 | 12/2012 | Nepomniachtchi |
| 8,379,914 | B2 | 2/2013 | Nepomniachtchi et al. |
| 8,452,098 | B2 | 5/2013 | Nepomniachtchi et al. |
| 8,483,473 | B2 | 7/2013 | Roach et al. |
| 8,577,118 | B2 | 11/2013 | Nepomniachtchi et al. |
| 8,582,862 | B2 | 11/2013 | Nepomniachtchi et al. |
| 8,831,361 | B2 | 9/2014 | Pintsov |
| 8,977,571 | B1 | 3/2015 | Bueche, Jr. et al. |
| 8,995,774 | B1 | 3/2015 | van Deventer et al. |
| 9,106,821 | B1 | 8/2015 | Baldwin |
| 9,269,010 | B2 | 2/2016 | Abulafia et al. |
| 9,367,831 | B1 | 6/2016 | Besehanic |
| 9,369,287 | B1 | 6/2016 | Sarvestani |
| 9,373,030 | B2 | 6/2016 | van Deventer et al. |
| 9,495,586 | B1 | 11/2016 | Hagen et al. |
| 9,665,754 | B2 | 5/2017 | Hagen |
| 9,740,926 | B2 | 8/2017 | Hagen et al. |
| 9,842,331 | B2 | 12/2017 | Nepomniachtchi et al. |
| 10,372,950 | B2 | 8/2019 | Hagen |
| 10,467,445 | B1 | 11/2019 | Rule et al. |
| 10,498,401 | B1 | 12/2019 | Rule et al. |
| 10,747,971 | B2 | 8/2020 | Hagen |
| 10,885,514 | B1 | 1/2021 | Hart et al. |
| 11,080,985 | B2 | 8/2021 | Paisson |
| 11,222,342 | B2 | 1/2022 | Rule et al. |
| 11,461,567 | B2 | 10/2022 | Singal et al. |
| 11,640,582 | B2 | 5/2023 | Singal et al. |
| 11,681,883 | B2 | 6/2023 | Singal et al. |
| 12,026,577 | B2 | 7/2024 | Singal et al. |
| 12,026,670 | B2 | 7/2024 | Singal et al. |
| 2002/0169721 | A1 | 11/2002 | Cooley et al. |
| 2004/0049401 | A1 | 3/2004 | Carr et al. |
| 2005/0007236 | A1 | 1/2005 | Lane et al. |
| 2005/0067487 | A1 | 3/2005 | Brundage et al. |
| 2006/0057550 | A1 | 3/2006 | Sahashi |
| 2006/0267737 | A1 | 11/2006 | Colby |
| 2006/0274945 | A1 | 12/2006 | Chu et al. |
| 2007/0109101 | A1 | 5/2007 | Colby |
| 2007/0122004 | A1 | 5/2007 | Brown et al. |
| 2007/0172155 | A1 | 7/2007 | Guckenberger |
| 2007/0200679 | A1 | 8/2007 | Colby |
| 2007/0200680 | A1 | 8/2007 | Colby |
| 2007/0200681 | A1 | 8/2007 | Colby |
| 2007/0200684 | A1 | 8/2007 | Colby |
| 2008/0024271 | A1 | 1/2008 | Oberman et al. |
| 2008/0046366 | A1 | 2/2008 | Bemmel et al. |
| 2008/0093447 | A1 | 4/2008 | Johnson et al. |
| 2008/0144947 | A1 | 6/2008 | Alasia et al. |
| 2008/0195858 | A1 | 8/2008 | Nguyen |
| 2008/0211622 | A1 | 9/2008 | Rindtorff et al. |
| 2008/0238681 | A1 | 10/2008 | Rodgers |
| 2008/0279959 | A1 | 11/2008 | Holmes |
| 2009/0106824 | A1 | 4/2009 | Morel et al. |
| 2009/0154778 | A1 | 6/2009 | Lei et al. |
| 2009/0167934 | A1 | 7/2009 | Gupta et al. |
| 2009/0309704 | A1 | 12/2009 | Chang et al. |
| 2010/0015585 | A1 | 1/2010 | Baker |
| 2010/0052852 | A1 | 3/2010 | Mohanty |
| 2010/0066072 | A1 | 3/2010 | Paeschke et al. |
| 2010/0150348 | A1 | 6/2010 | Fairbanks et al. |
| 2010/0245034 | A1 | 9/2010 | D'Oliveiro et al. |
| 2010/0263034 | A1 | 10/2010 | Banchelin |
| 2010/0329577 | A1 | 12/2010 | Kitai |
| 2010/0332838 | A1 | 12/2010 | Zhu et al. |
| 2011/0068173 | A1 | 3/2011 | Powers et al. |
| 2011/0076941 | A1* | 3/2011 | Taveau ................ G06Q 10/10 |
| | | | 705/40 |
| 2011/0209192 | A1 | 8/2011 | LeClerc Greer et al. |
| 2011/0248851 | A1 | 10/2011 | Pham |
| 2011/0309146 | A1 | 12/2011 | Zazzu et al. |
| 2012/0011010 | A1 | 1/2012 | Boulanouar |
| 2012/0139703 | A1 | 6/2012 | Szoke et al. |
| 2012/0144201 | A1* | 6/2012 | Anantha ............... H04L 9/3247 |
| | | | 713/172 |
| 2012/0154246 | A1 | 6/2012 | Tietke et al. |
| 2012/0155700 | A1 | 6/2012 | Huang |
| 2012/0229872 | A1 | 9/2012 | Dolev |
| 2012/0230577 | A1 | 9/2012 | Calman et al. |
| 2012/0299709 | A1 | 11/2012 | Nishimura |
| 2012/0322374 | A1 | 12/2012 | Yamaoka et al. |
| 2013/0012124 | A1 | 1/2013 | Hymel et al. |
| 2013/0061050 | A1* | 3/2013 | Davis .................. G06Q 10/107 |
| | | | 713/168 |
| 2013/0084801 | A1 | 4/2013 | Royston et al. |
| 2013/0198079 | A1 | 8/2013 | Mattes et al. |
| 2013/0204786 | A1 | 8/2013 | Mattes et al. |
| 2013/0214898 | A1 | 8/2013 | Pineau et al. |
| 2013/0214902 | A1 | 8/2013 | Pineau et al. |
| 2013/0222119 | A1 | 8/2013 | Tietke et al. |
| 2013/0243266 | A1 | 9/2013 | Lazzouni |
| 2013/0281014 | A1 | 10/2013 | Frankland et al. |
| 2013/0305059 | A1* | 11/2013 | Gormley .................. G07F 7/08 |
| | | | 713/189 |
| 2013/0311788 | A1 | 11/2013 | Faher et al. |
| 2014/0002336 | A1 | 1/2014 | Kaine |
| 2014/0003717 | A1 | 1/2014 | Brito et al. |
| 2014/0009348 | A1 | 1/2014 | Behin |
| 2014/0019768 | A1 | 1/2014 | Pineau et al. |
| 2014/0029857 | A1 | 1/2014 | Kompalli et al. |
| 2014/0046954 | A1 | 2/2014 | MacLean et al. |
| 2014/0052636 | A1 | 2/2014 | Mattes |
| 2014/0058951 | A1 | 2/2014 | Kuppuswamy |
| 2014/0168012 | A1 | 6/2014 | Mankowski et al. |
| 2014/0230039 | A1 | 8/2014 | Prakash et al. |
| 2014/0253297 | A1 | 9/2014 | Kawaguchi et al. |
| 2014/0270400 | A1* | 9/2014 | Natale .................... G06Q 50/14 |
| | | | 382/115 |
| 2014/0279519 | A1* | 9/2014 | Mattes ................... G06Q 20/12 |
| | | | 705/44 |
| 2014/0340701 | A1 | 11/2014 | Okamura et al. |
| 2014/0369570 | A1 | 12/2014 | Cheikh et al. |
| 2014/0376050 | A1 | 12/2014 | Baba |
| 2015/0004934 | A1 | 1/2015 | Qian et al. |
| 2015/0078671 | A1 | 3/2015 | van Deventer et al. |
| 2015/0088776 | A1 | 3/2015 | Parrish et al. |
| 2015/0170085 | A1 | 6/2015 | Amtrup et al. |
| 2015/0199568 | A1 | 7/2015 | van Deventer et al. |
| 2015/0312879 | A1 | 10/2015 | Lagnado |
| 2015/0347839 | A1* | 12/2015 | Hagen ................... G06Q 10/10 |
| | | | 382/187 |
| 2016/0050324 | A1 | 2/2016 | Ohshita et al. |

(56) References Cited

U.S. PATENT DOCUMENTS

| | | |
|---|---|---|
| 2016/0078434 A1 | 3/2016 | Huxham et al. |
| 2016/0104041 A1 | 4/2016 | Bowers et al. |
| 2016/0119548 A1 | 4/2016 | Geurts et al. |
| 2016/0162729 A1 | 6/2016 | Hagen et al. |
| 2016/0210621 A1 | 7/2016 | Khan |
| 2016/0128568 A1 | 8/2016 | Bellamy et al. |
| 2016/0239657 A1* | 8/2016 | Loughlin-Mchugh ...................... G06F 21/45 |
| 2016/0360348 A1 | 12/2016 | Ueda |
| 2016/0366294 A1 | 12/2016 | Uroskin et al. |
| 2017/0156024 A1 | 6/2017 | Shigaki et al. |
| 2017/0168759 A1 | 6/2017 | Hirotani et al. |
| 2017/0213211 A1 | 7/2017 | Sibert et al. |
| 2017/0255800 A1 | 9/2017 | Hagen |
| 2017/0303262 A1 | 10/2017 | Yuan et al. |
| 2017/0324750 A1 | 11/2017 | Khan |
| 2017/0328805 A1 | 11/2017 | Bermudez et al. |
| 2017/0337403 A1 | 11/2017 | Ohno |
| 2018/0088186 A1 | 3/2018 | Bhattacharyya |
| 2018/0140946 A1 | 5/2018 | Ueno et al. |
| 2018/0175676 A1 | 6/2018 | Ikefuji et al. |
| 2018/0189583 A1 | 7/2018 | Wohlken et al. |
| 2018/0260617 A1 | 9/2018 | Jones et al. |
| 2018/0278739 A1 | 9/2018 | Mei |
| 2018/0374383 A1 | 12/2018 | Thielen |
| 2019/0043038 A1 | 2/2019 | Jang et al. |
| 2019/0089164 A1 | 5/2019 | Lu |
| 2019/0173873 A1 | 6/2019 | Brown et al. |
| 2019/0354736 A1 | 11/2019 | Hagen |
| 2020/0195636 A1 | 6/2020 | Landrock et al. |
| 2020/0249835 A1 | 8/2020 | Ueno et al. |
| 2020/0334429 A1 | 10/2020 | Singal et al. |
| 2020/0334431 A1 | 10/2020 | Singal et al. |
| 2021/0156691 A1 | 5/2021 | Kozhaya et al. |
| 2021/0240773 A1 | 8/2021 | Chen et al. |
| 2021/0342840 A1 | 11/2021 | Rule et al. |
| 2021/0374387 A1* | 12/2021 | Whitelaw ................ G06T 7/194 |
| 2022/0076261 A1 | 3/2022 | Rule et al. |
| 2023/0018280 A1 | 1/2023 | Singal et al. |
| 2023/0139948 A1 | 5/2023 | Akashika |
| 2023/0222444 A1 | 7/2023 | Singal et al. |
| 2023/0259726 A1 | 8/2023 | Singal et al. |
| 2024/0296418 A1 | 9/2024 | Singal et al. |
| 2024/0303451 A1 | 9/2024 | Singal et al. |

FOREIGN PATENT DOCUMENTS

| | | |
|---|---|---|
| EP | 1724707 A2 | 11/2006 |
| EP | 1755065 A2 | 2/2007 |
| EP | 1851668 A2 | 11/2007 |
| EP | 1891607 B1 | 10/2008 |
| EP | 2073153 A1 | 6/2009 |
| EP | 2100403 A2 | 9/2009 |
| EP | 2075726 B1 | 7/2010 |
| EP | 2240878 A2 | 10/2010 |
| EP | 2274702 A1 | 1/2011 |
| EP | 1938118 B1 | 5/2012 |
| EP | 2465075 A1 | 6/2012 |
| EP | 2474931 A1 | 7/2012 |
| EP | 2085913 B1 | 8/2012 |
| EP | 2508999 A1 | 10/2012 |
| EP | 2038811 B1 | 1/2013 |
| EP | 2603019 A1 | 6/2013 |
| EP | 2591463 B1 | 10/2014 |
| EP | 2803016 A1 | 11/2014 |
| EP | 2219878 B1 | 3/2015 |
| EP | 2973378 A1 | 1/2016 |
| EP | 2976706 A2 | 1/2016 |
| EP | 3079103 A1 | 10/2016 |
| EP | 3093797 A1 | 11/2016 |
| EP | 3385895 A1 | 10/2018 |
| EP | 3570215 A1 | 11/2019 |
| EP | 2798571 B1 | 4/2020 |
| WO | WO2007105720 A1 | 9/2007 |
| WO | WO2013000614 A1 | 1/2013 |
| WO | WO2014025540 A2 | 2/2014 |
| WO | WO2016128568 A1 | 8/2016 |
| WO | WO2016193765 A1 | 12/2016 |
| WO | WO2017207064 A1 | 7/2017 |
| WO | WO2018018175 A1 | 2/2018 |
| WO | WO-2018152597 A1 * | 8/2018 |
| WO | WO2019002832 A1 | 1/2019 |
| WO | WO2019009685 A1 | 1/2019 |
| WO | WO2019048574 A1 | 3/2019 |
| WO | WO2019089164 A1 | 5/2019 |
| WO | WO2021021372 A1 | 2/2021 |
| WO | WO2021021373 A1 | 2/2021 |
| WO | WO2021021374 A1 | 2/2021 |

OTHER PUBLICATIONS

"Machine Readable Travel Documents (MRTDs): History, Interoperability, and Implementation", Version: Release 1, Draft 1.4, International Civil Aviation Organization, Mar. 23, 2007, pp. 1-60.

Pooters, Ivo, "Keep Out of My Passport: Access Control Mechanisms in E-Passports" in: Technical Report, Jun. 15, 2008, pp. 1-13.

Kinneging, Tom A.F., "Pki for Machine Readable Travel Documents offering ICC Read-Only Access", Version 1.1, International Civil Aviation Organization, Oct. 1, 2004, pp. 1-57.

"International Search Report" and "Written Opinion", Patent Cooperation Treaty Application PCT/US2020/040371, Sep. 25, 2020, 15 pages.

"International Search Report" and "Written Opinion", Patent Cooperation Treaty Application PCT/US2020/040374, Sep. 28, 2020, 9 pages.

"International Search Report" and "Written Opinion", Patent Cooperation Treaty Application PCT/US2020/040368, Sep. 30, 2020, 20 pages.

Wikipedia, "Euclidean Vector", [online], [retreived on Sep. 30, 22], Retrieved from the Internet: < URL:https://en.wikipedia.org/wiki/Euclidean_vector>, Revision dated Jun. 12, 2020, 18 pages.

* cited by examiner

SELF-SOVEREIGN IDENTITY SYSTEMS AND METHODS FOR IDENTIFICATION DOCUMENTS

CROSS-REFERENCE TO RELATED APPLICATIONS

The present utility patent application is a continuation-in-part application of and claims priority benefit of U.S. patent application Ser. No. 16/529,293 filed Aug. 1, 2019, now U.S. Pat. No. 10,747,971, which is a continuation of and claims priority benefit of U.S. patent application Ser. No. 15/604,372, filed May 24, 2017, now U.S. Pat. No. 10,372,950, which is a continuation of U.S. patent application Ser. No. 14/722,058, filed May 26, 2015, now U.S. Pat. No. 9,665,754, which is related to and claims priority benefit of U.S. provisional application No. 62/004,101, filed May 28, 2014 under 35 U.S.C. 119 (e). The present utility patent application is related to U.S. patent application Ser. No. 16/917,832 filed Jun. 30, 2020, now U.S. Pat. No. 11,461,567, entitled "Systems and Methods of Identification Verification Using Hybrid Near-Field Communication and Optical Authentication" and U.S. patent application Ser. No. 16/917,746 filed Jun. 30, 2020 entitled "Alignment of Antennas on Near Field Communication Devices for Communication". The contents of these applications are incorporated herein by reference for all purposes to the extent that such subject matter is not inconsistent herewith or limiting hereof.

TECHNICAL FIELD

The present disclosure relates generally to identification (ID) verification, and in more detail, to self-sovereign identification systems and methods using a device with near-field communication (NFC) functionality.

SUMMARY

In one or more embodiments, the present disclosure pertains to a method, comprising transmitting data obtained from a near-field communications (NFC) chip of an object to the service provider, the data comprising identifying information for an owner of the object; receiving a user identity packet from the service provider, the user identity packet being generated by the service provider based on verification of an identity of the owner and validity of the NFC chip; storing the user identity packet on a computing device; receiving a request from a first requesting device or service for the data stored on the NFC chip of the object; and transmitting the user identity packet from the computing device to the first requesting device or service instead of the data.

In one or more embodiments, the present disclosure pertains to a method, comprising obtaining data comprising identifying information for an owner of an identification document, the data having been obtained from a near-field communications (NFC) chip by a computing device; at least one of actively or passively verifying the identity of the owner based on the identifying information; validating the NFC chip to determine that the NFC chip has not been tampered with; and generating a self-sovereign identity for local storage on the computing device, the self-sovereign identity being enhanced by the validity of the NFC chip to establish an unbroken chain of trust between the owner and a government entity that issued the identification document, wherein the self-sovereign identity is provided to a first requesting device or service instead of the data stored on the NFC chip after the first requesting device or service has requested the data of the identification document In one or more embodiments, the present disclosure pertains to a system, comprising a processor; and a memory for storing instruction, the processor executing the instructions to: transmit an image of an identification document to a service provider, the identification document comprising a near-field communications (NFC) chip that stores data comprising identifying information for an owner of the identification document comprising; transmit the data of the NFC chip to the service provider; receive a user identity packet from the service provider, the user identity packet being generated by the service provider based on verification of an identity of the owner and validity of the NFC chip; store the user identity packet on the mobile device; receive a request from a first requesting device or service for the data stored on the NFC chip of the identification document; and transmit the user identity packet from the mobile device to the first requesting device or service instead of the data.

BRIEF DESCRIPTION OF THE DRAWINGS

Embodiments are illustrated by way of example and not limitation in the figures of the accompanying drawings.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

Identity verification is important in enabling and securing financial operations, hiring processes, health care, professional services, and so forth. However, ID documents can be tampered with and falsified for fraudulent purposes. To provide an additional protective measure, an RFID chip can be embedded in the ID document. Digital data stored on the RFID chip can duplicate data printed on the ID document.

The digital data can be authenticated via Public Key Infrastructure, which makes forgery difficult and expensive. However, conventional digital verification using RFID chip requires special purpose readers.

A system for ID document verification is provided. The system for ID document verification can allow verification of ID documentation having an embedded RFID chip. An image of the ID document can be captured using a camera associated with a client device. The client device can transmit the ID document image to a server for processing for retrieval of printed data represented by the ID document (e.g., holder's name, age, fingerprints, document number, and expiration date). The retrieved data may be sent back to the client device and further to a server. The system for ID document verification residing on the client device may use the retrieved data as a key to unlock the RFID chip and access digital data stored in the RFID chip. The digital data may be transmitted to the server, where the system for ID document verification compares the printed and digital data to determine whether the printed and digital data are identical. Additionally, the system for ID document verification may perform a facial recognition using the printed and digital data. Based on the comparison and/or recognition, similarities between the printed and digital data may be ascertained. Such verification can establish whether printed data in the ID document was altered and whether the ID document is authentic. In some embodiments, the system for ID document verification can also allow for personal information extraction from a physical ID document.

Figure 1:
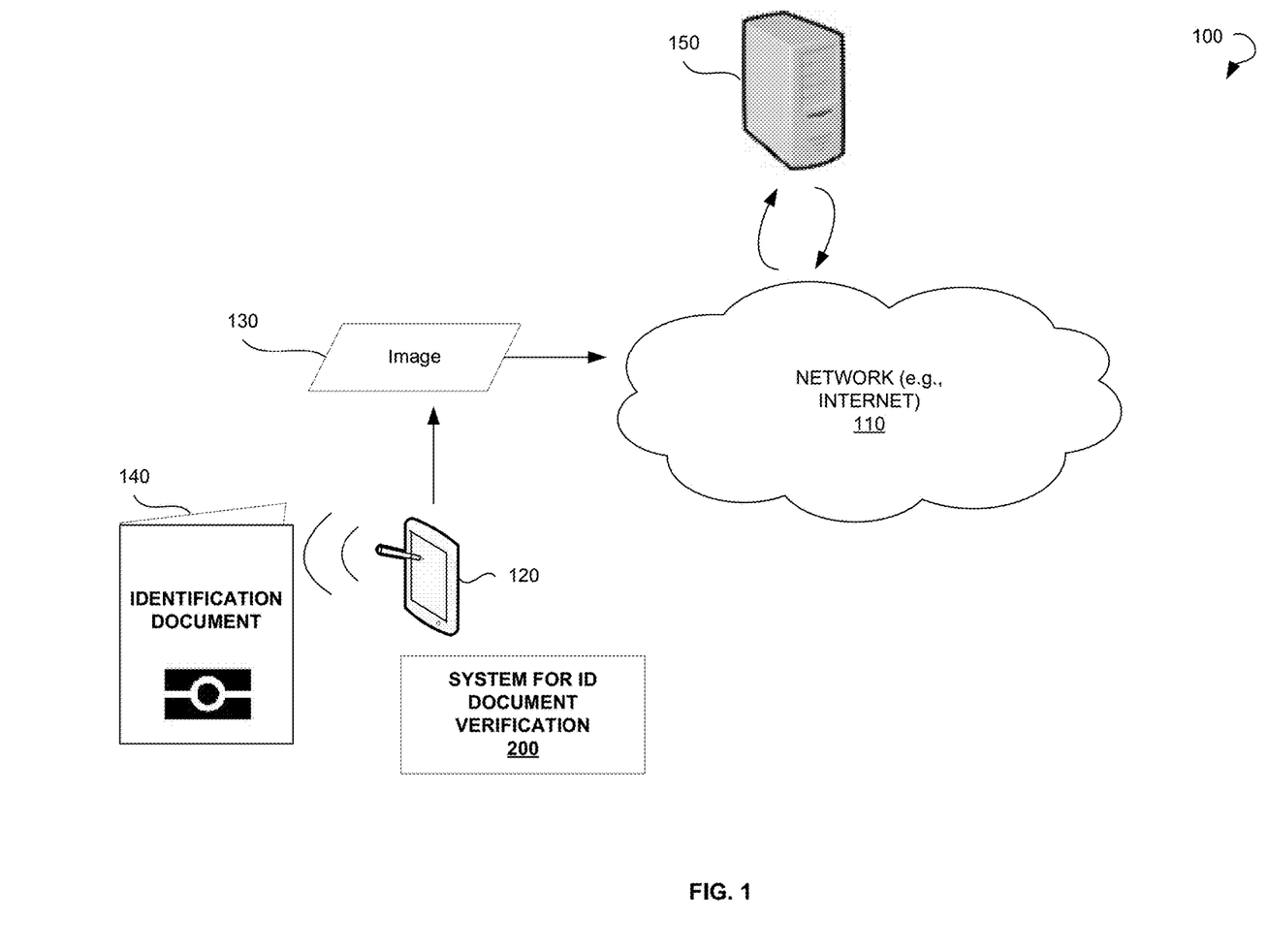
FIG. 1 illustrates an environment within which systems and methods for ID document verification are implemented.
Figure 2:
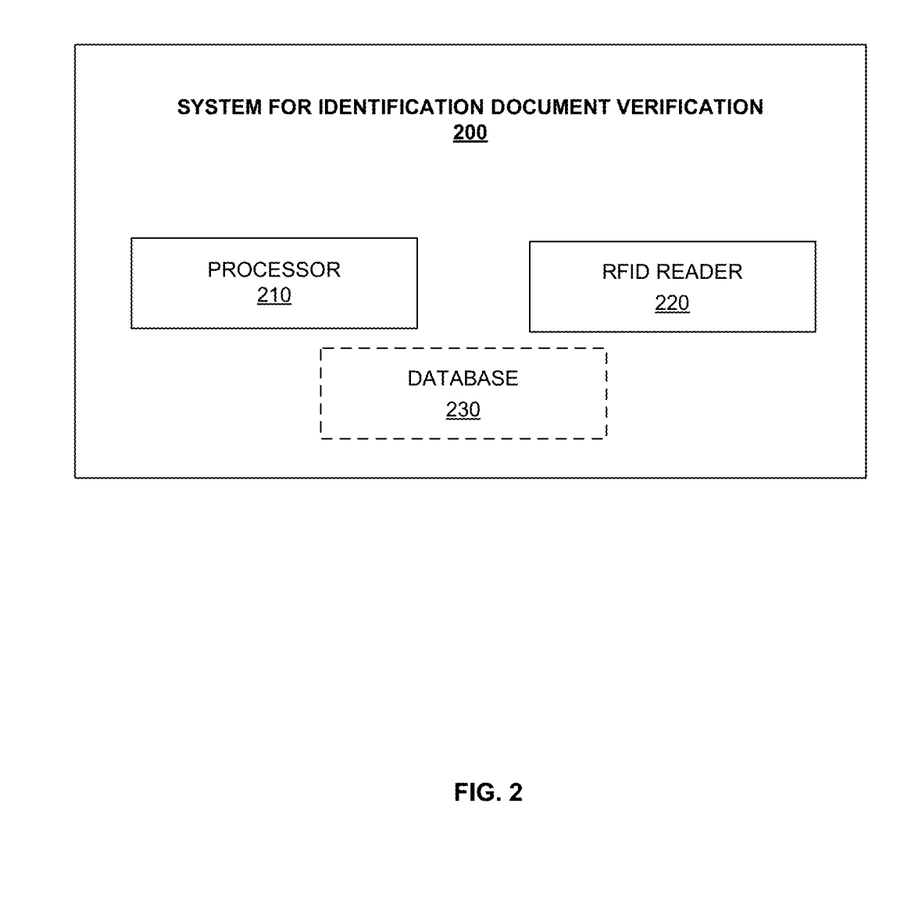
FIG. 2 is a block diagram showing a system for ID document verification.

FIG. 1 illustrates an environment 100 within which the systems and methods for ID document verification can be implemented, in accordance with some embodiments. A system 200 for ID document verification may include a server-based distributed application, which may include a central component residing on a server 150 and one or more client applications residing on a client device 120 and communicating with the central component via a network 110. A user may communicate with the system 200 via a client application available through the client device 120. In other embodiments, the system 200 may be a cloud-based application with the central component residing on the server 150 and accessible via a web browser on the client device 120.

The network 110 may include the Internet or any other network capable of communicating data between devices. Suitable networks may include or interface with any one or more of, for instance, a local intranet, a Personal Area Network, a Local Area Network (LAN), a Wide Area Network (WAN), a Metropolitan Area Network (MAN), a Virtual Private Network (VPN), a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network (ISDN) line, a dial-up port such as a V.90, V.34 or V.34bis analog modem connection, a cable modem, an Asynchronous Transfer Mode connection, or an Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System (GPS), cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an infrared port, a Small Computer Systems Interface connection, a Universal Serial Bus (USB) connection or other wired or wireless, digital or analog interface or connection, mesh, or Digi® networking. The network 110 may include a network of data processing nodes that are interconnected for the purpose of data communication. The network may include a Software-defined Networking (SDN). The SDN may include one or more of the above network types. Generally, the network 110 may include a number of similar or dissimilar devices connected together by a transport medium enabling communication between the devices by using a predefined protocol. Those skilled in the art will recognize that the present disclosure may be practiced within a variety of network configuration environments and on a variety of computing devices.

An ID document 140 can include a document having an embedded RFID chip (for example, a biometric passport, digital passport, government issued ID, drivers' license, and so forth).

To verify the ID document 140, a user can cause the system 200 to capture an image 130 of the ID document 140 by using a camera associated with the client device 120 (smart phone, a notebook, a personal computer (PC), a tablet PC, or the like). An image 130 associated with the ID document 140 may be transmitted to the server 150 either via a mobile application, a stand-alone web application, or via a fully integrated service (XML, i-frame). The image 130 may be captured by a camera associated with the client device 120, e.g. a phone camera, a tablet PC camera, and so forth. The server 150 may receive and analyze the image 130 to recognize printed data associated with the ID document 140 (for example, issue date, holder's name, age, gender, holder's fingerprint, and so forth). Printed data can be recognized by optical character recognition (OCR).

The results of the printed data analysis can be transmitted back to the client device 120. The client device 120 may scan the RFID chip embedded in the ID document 140 using an RFID reader (or an NFC reader). The RFID reader can be a part of the client device 120 or it can be detachably attached to the client device 120 via one of the ports. Alternatively, the RFID reader can be a stand-alone device and the client device 120 can communicate with it wirelessly (for example, via Bluetooth).

The retrieved printed data can be used as a key to access the digital data on the RFID chip of the ID document 140. By matching the digital and printed data, the system 200 for ID document verification may confirm authenticity of the ID document 140.

FIG. 2 shows a detailed block diagram of the system 200 for ID document verification, in accordance with an example embodiment. The system 200 may include a processor 210, an RFID reader 220, and an optional database 230. The processor 210 may be configured to receive an image associated with an ID document. The image may be captured by the camera associated with the client device. The processor 210 may transmit the image to a remote server. The server processes the image using OCR to detect various zones on the image containing data associated with the ID document and a holder of the ID document and extract printed data from the image. The processor 210 may be further configured to receive the extracted printed data from the server. The RFID reader 220 may use the printed data as a key to access the RFID chip of the ID document. In such a way, the RFID reader 220 may retrieve digital data from the RFID chip. The processor 210 may analyze the digital data and match the digital and printed data to check if they are identical. Alternatively, a server may perform the analysis. The server may further perform facial recognition based on photos from the digital data (e.g., RFID passphoto), from the printed data (e.g., passphoto ID), and/or a photo of the user captured by the client device. If the digital and printed data proves identical, the ID document may be verified. If the digital and printed data differ or are absent or nonstandard, the ID document may be refused.

An optional database 230 may be configured to store printed data and digital data as well as verification results.

The processor 210 may comprise, or may be in communication with, media (for example, computer-readable media) that stores instructions that, when executed by the processor 210, cause the processor 210 to perform the elements described herein. Furthermore, the processor 210 may operate any operating system capable of supporting locally executed applications, client-server based applications, and/or browser or browser-enabled applications.

Figure 3:
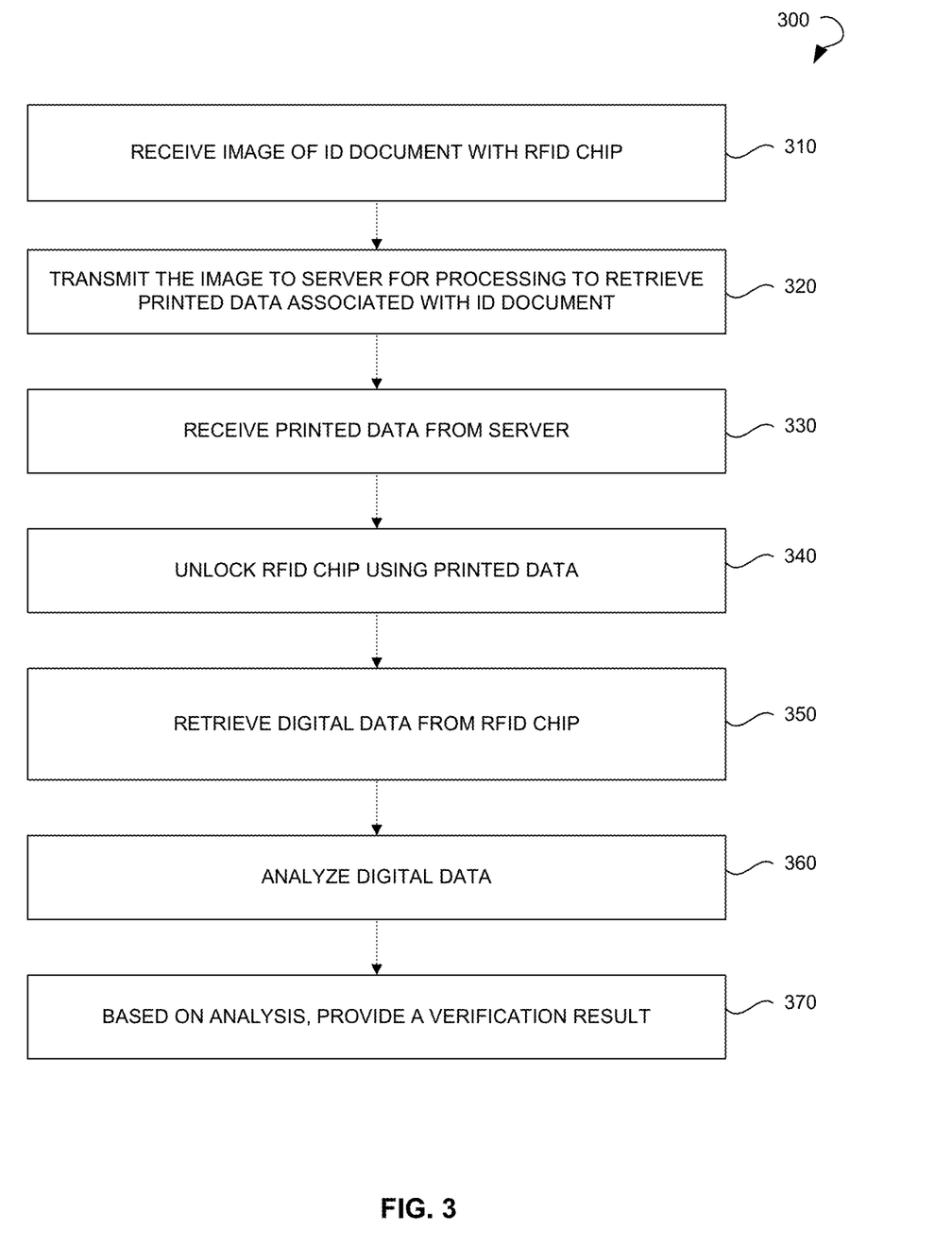
FIG. 3 is a process flow diagram showing a method for ID document verification.

FIG. 3 is a process flow diagram showing a method 300 for ID document verification within the environment described with reference to FIG. 1. The method 300 may commence with receiving an image of an ID document that has an embedded RFID chip at operation 310. The ID document may include a government issued ID, a student ID, an employment ID, a driver's license, a passport, a travel document, and so forth. The received image may include a picture, a scan, and so forth. The image may be captured by a camera associated with the user (for example, a standalone camera; a camera of a user device, such as a smart phone, a PC, a tablet PC; and so forth).

The method 300 may proceed with transmitting the image to a server for processing at operation 320. The processing can include optical character recognition to obtain printed data. The printed data may include holder's name, date of birth, gender, fingerprint, document number, and so forth. The printed data obtained as a result of processing may be received from the server at operation 330 and used to unlock the RFID chip at operation 340. After unlocking the RFID chip (for example, using any recognized text as a key to access the RFID chip), digital data (or biometric data) stored in the RFID chip may be retrieved at operation 350.

At operation 360, the digital data may be analyzed to check the authenticity of the ID document. The digital data in general duplicates the printed data. By comparing the digital data from the RFID chip and the recognized printed data, the system for ID document verification can ensure that printed data was not altered and the ID document is not forged. Based on the analysis, the system may determine that the digital data and printed data are identical and verify the ID document. Alternatively, according to the analysis, the system may determine one or more evidences of forgery (for example, a difference of the printed data and the digital data, an absence of the digital data, nonstandard digital data, and so forth). On the determining the one or more evidences of forgery, the system may reject the ID document. A verification result may be provided at operation 370.

In some embodiments, data of the verified ID document may be used to automatically populate an electronic form, fields associated with a web resource, and so forth. Thus, filling in forms may be facilitated and accelerated. Moreover, automatic filling in of electronic forms or blanks allows avoiding mistakes and misprints pertaining to manual entry.

Figure 4:
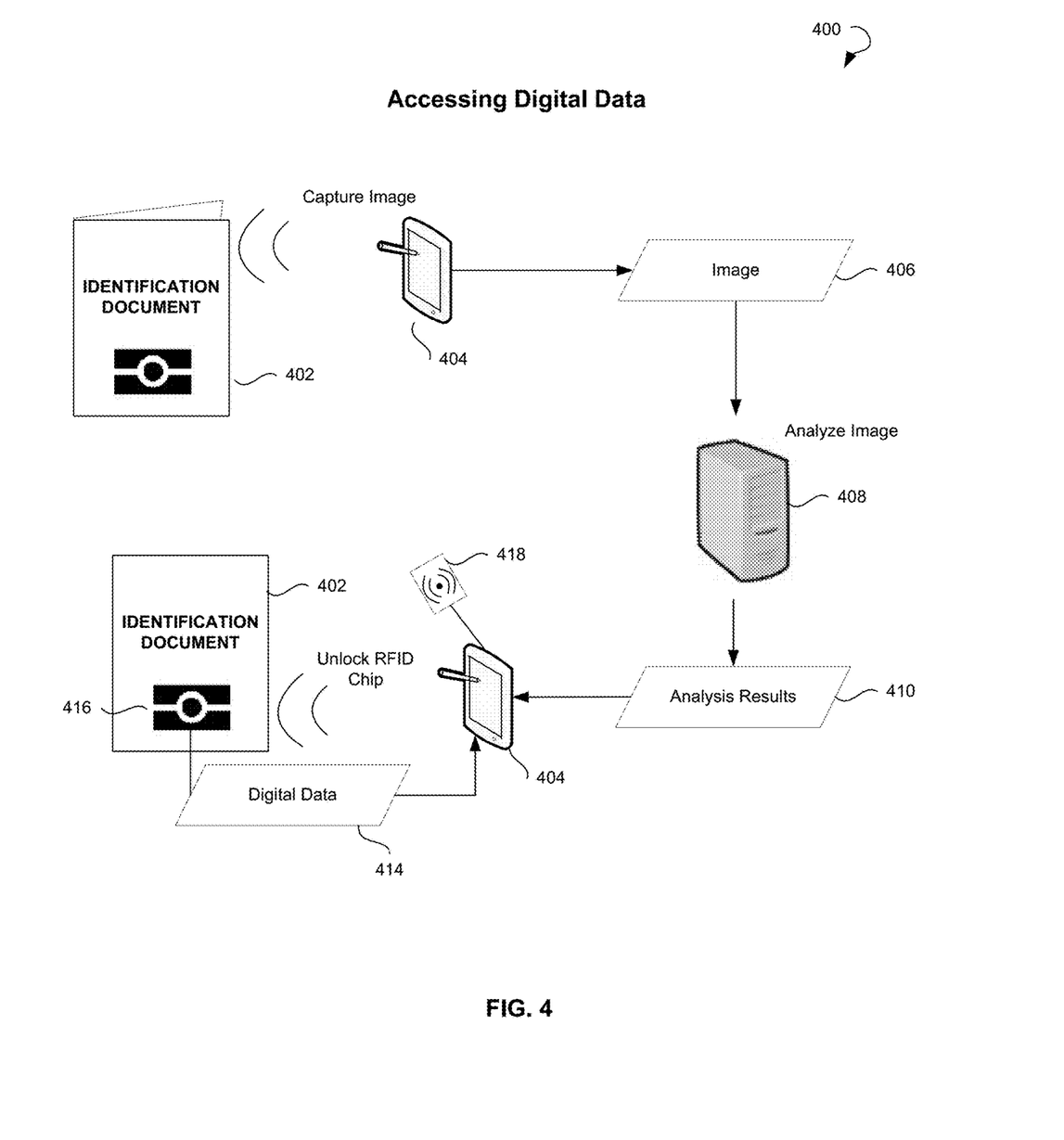
FIG. 4 illustrates accessing digital data related to an ID document.

FIG. 4 illustrates accessing digital data 400 in a RFID chip associated with the ID document, in accordance with some embodiments. A user may capture an image 406 of an ID document 402 using a camera embedded in or connected to a client device 404. The image 406 may be automatically transmitted to a server 408. The image 406 received by the server 408 may be subjected to OCR. Printed information in the image 406 may be analyzed to extract textual and/or other relevant data associated with the ID document 402 and the holder of the ID document 402 (e.g., holder's date of birth, first name, last name, and the like). The results of the analysis 410 can be transmitted back to the client device 404.

The client device 404 can scan an RFID chip 416 in the ID document 402 using an RFID reader 418 (or an NFC reader). The RFID reader 418 can be either embedded in the client device 404 or detachably attached to the client device 404 via a port of the client device 404. The digital data 414 in the RFID chip 416 may be encrypted, so the retrieved printed data can be used as a key to access the digital data 414.

The digital data 414 and printed data can be compared on the client device 404 to verify ID document identity. Additionally, the digital data 414 can be used to fill-in forms, employment forms, medical records, and so forth.

Figure 5:
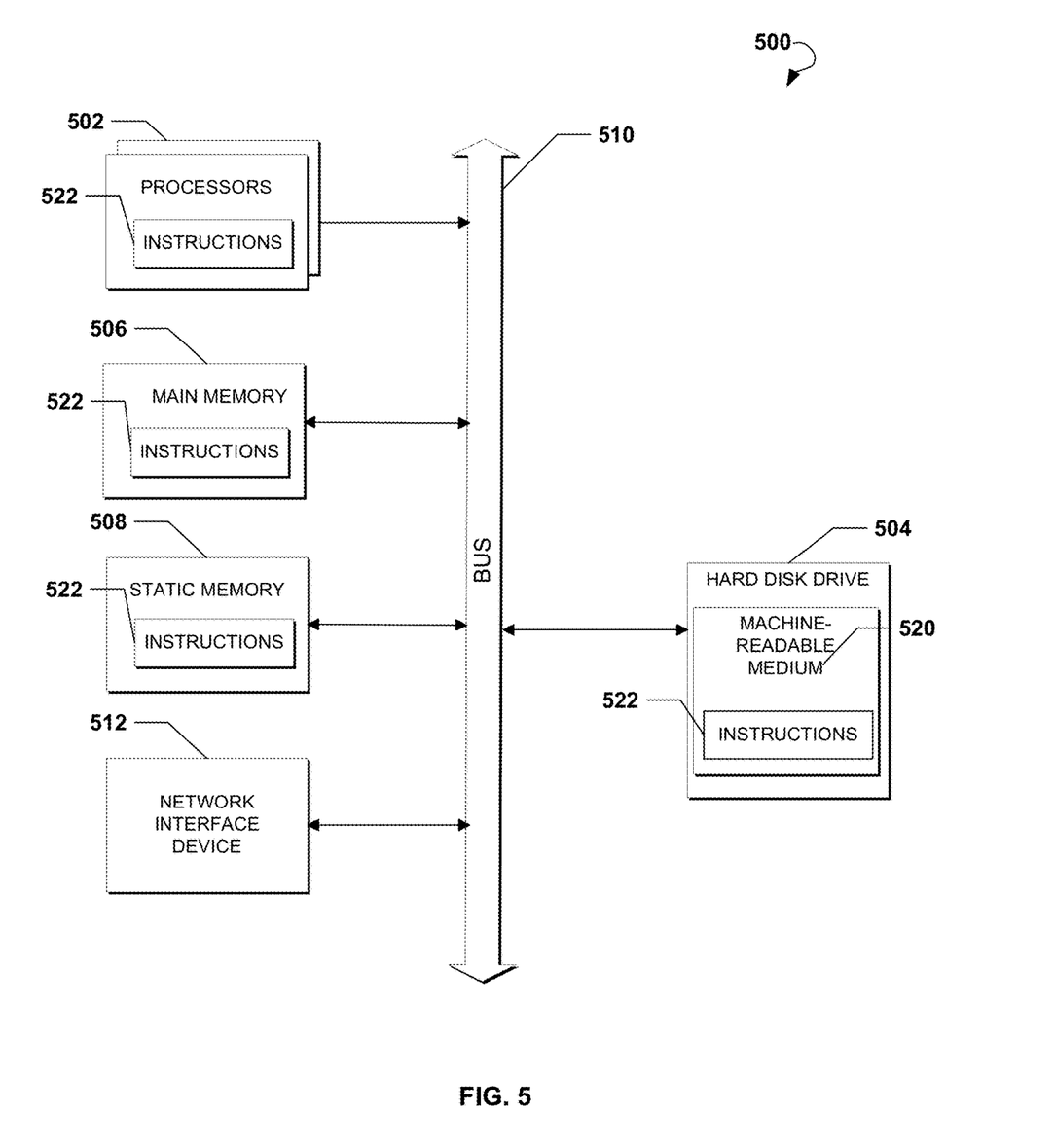
FIG. 5 illustrates a diagrammatic representation of a computing device for a machine in the exemplary electronic form of a computer system, within which a set of instructions for causing the machine to perform any one or more of the methodologies discussed herein can be executed.

FIG. 5 shows a diagrammatic representation of a computing device for a machine in the exemplary electronic form of a computer system 500, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box, a cellular telephone, a digital camera, a portable music player (e.g., a portable hard drive audio device, such as an Moving Picture Experts Group Audio Layer 3 player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502, a hard disk drive 504, a main memory 506, and a static memory 508, which communicate with each other via a bus 510. The computer system 500 may also include a network interface device 512. The hard disk drive 504 may include a computer-readable medium 520, which stores one or more sets of instructions 522 embodying or utilized by any one or more of the methodologies or functions described herein. The instructions 522 can also reside, completely or at least partially, within the main memory 506, the static memory 508, and/or within the processors 502 during execution thereof by the computer system 500. The main memory 506 and the processors 502 also constitute machine-readable media.

While the computer-readable medium 520 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks (DVDs), Random Access Memory (RAM), Read-Only Memory (ROM), and the like.

According to some embodiments, the present disclosure is directed to self-sovereign identity systems and methods for identification documents. These systems and methods can be used to create a self-sovereign identity (SSI) that is backed by verification of near-field communication (NFC) information stored on an object. It will be understood that while some embodiments disclosed herein may contemplate using NFC-backed SSI in use cases involving government-issued IDs or other identity documents, the concepts of the present disclosure are not so limited. That is, any process or use case that relies upon obtaining data from an NFC chip to perform a transaction (financial or otherwise) can leverage the NFC-backed SSI solutions described herein.

For context, some forms of SSI evidence contradict core principles of control, persistence, portability, and interoperability. Information backing some identity elements is owned and operated by private companies, who may restrict, alter, or delete that data (not to mention go out of business) without warning. These concerns do not typically apply to government-issued IDs, which incorporate an NFC chip on which NFC data is stored.

Most of the methods proposed to authenticate an SSI today rely on a quantity of identity elements to make up for shortcomings in the authentication quality of any single element. However, the critical flaw in this logic is that these identity elements are far more interconnected than people would care to admit. Yes, a person's identity can be recognized and authenticated by a combination of [mobile phone+ social media account #1+social media account #2+banking information], but what happens when the user's email is compromised, or their phone is stolen? Suddenly these "unique" elements all fall like a house of cards, and a bad actor completely controls the user's identity.

NFC authentication, on the other hand, has zero known vulnerability. A user who successfully passes both passive and active authentication absolutely has physical access to the original government-issued ID. In further adaptations, NFC authentication can be combined with face comparison technology, and an unbroken chain of trust can be established directly from the user to the issuing government entity.

Also, there are four central principles of SSI: control, access, consent, and minimalization. Using the systems and methods disclosed herein, an identity owner can freely access their identity elements, select the specific identity elements they wish to share, and rest assured that the remainder of their identity remains protected and unshared. These and other advantages of NFC-backed SSI are disclosed herein and with reference to FIGS. 6-8.

Figure 6:
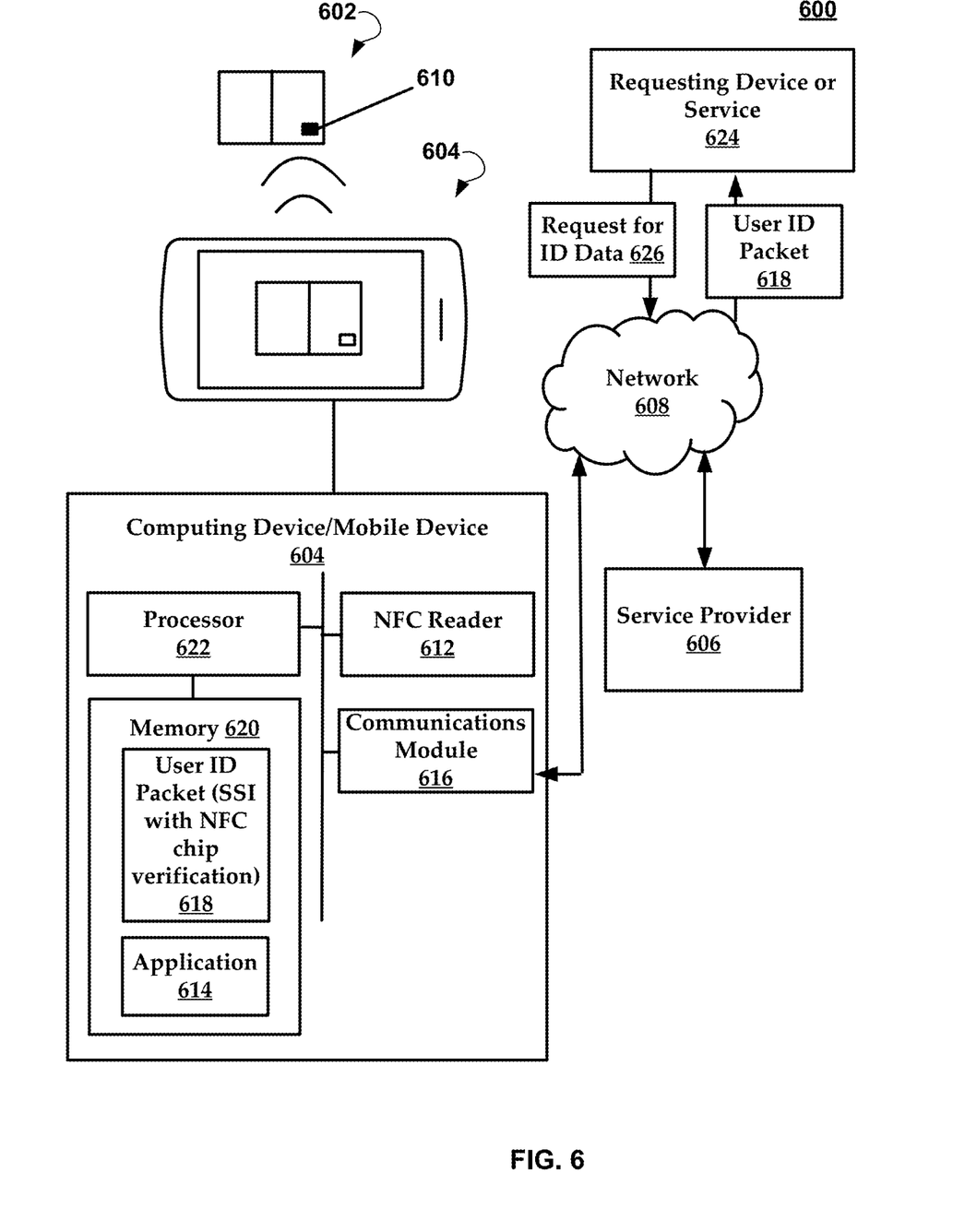
FIG. 6 illustrates an environment within which systems and methods for ID document verification are implemented.

FIG. 6 illustrates another example system 600 that can be used for self-sovereign identification of a user. Generally, the system 600 leverages the tamper-resistant nature of near-field communication hardware to allow for secure, self-sovereign identification of a user. Broadly, the user can utilize the system 600 to obtain a user identity packet (e.g., self-sovereign identification data) that can be stored in an encrypted manner on a mobile device. To be sure, many systems or services require presentation of an ID document for access. These systems or services desire to confirm the identity of the user. Rather than having to submit and verify the user's identification each time such identification is needed by a device/system or service, the user can submit the user identity packet rather than present an ID document such as a driver's license or passport.

In general, the user need only verify their identity and/or ID document once to obtain the user identity packet from a service provider using methods disclosed herein. Once the user identity packet is obtained from the service provider and stored on the mobile device, subsequent processes that would have necessitated the use of the ID document can be resolved using the user identity packet stored on the mobile device. For example, once a user stores a user identity packet related to a passport on their device, future requests for data stored on the ID document can be fulfilled using the user identity packet stored on the mobile device.

In general, the system 600 can include an ID document 602, a mobile device 604, a service provider 606, and a network 608. The network 608 can include any of the network(s) disclosed infra. The ID document 602 includes a near-field communication (NFC) chip 610 that is adapted to store data such as a country signing certificate, a data hash or other data construct used to store at least information regarding an owner of the ID document. Authentication of data stored on the NFC chip involves performing a chain-of-trust process to analyze the data on the NFC chip that utilizes the country signing certificate. In general, data stored on chip that may be encrypted with a private key. These data can be obtained using a public key provided by the issuing country or other authority.

It will be understood that while some embodiments contemplate the use of NFC or RFID chips, the teachings of the present disclosure are not so limited. That is, the self-sovereign ID processes disclosed herein can be enabled using similar types of hardware enabled ID documents. Additionally, while some examples rely on the use of the mobile device 604, any other computing device can be configured for use in accordance with the present disclosure. That is, any computing device can be used as long as the computing device includes at least a short-range wireless reader that can be used for NFC, RFID, and the like. In some embodiments, the computing device can be configured to include a camera for obtaining images of a user as disclosed herein.

The mobile device 604 comprises an NFC reader 612 that is configured to read data from the NFC chip 610, an application 614, and a communications module 616. In some embodiments, to obtain a user identity packet from the service provider 606, the user may be prompted to obtain an image of the ID document 602 from on an application 614 executing on the mobile device 604. The application 614 can present a message on the display of the mobile device 604 to prompt the user to obtain an image of the ID document 602 using a camera of the mobile device 604. Once the image of the ID document 602 is obtained, the image can be transmitted to the service provider 606 using the communications module 616 over the network 608.

In some embodiments, the ID document 602 can be verified in an optional step using any of the processes described above with respect to the embodiments of FIGS. 1-4. The application 614 can further prompt the user to extract data stored on the NFC chip 610. Data obtained from the NFC chip 610 can be transmitted to the service provider 606 for verification. For example, using the public key provided by the issuing country, the mobile device 604 can utilize the public key to extract the data on the NFC chip 610 and transmit the same to the service provider 606.

In some instances, the user can be instructed to obtain a current biometric such as a selfie or photograph with their mobile device 604. The biometric could include a retinal or iris scan, a fingerprint, or other biometric data. The biometric can be received and evaluated, the biometric being used as a second or additional means for verifying the identity of the owner/user. In some instances, the biometric (other than a photo) can be used to initially verify the identity of the owner/user.

The NFC chip 610 or the service provider 606 can store baseline biometric data for the user. These baseline biometric data can be obtained when the user originally applies for or obtains the ID document 602. These data are embedded or stored on the NFC chip 610 of the ID document 602 by the issuing authority. This biometric data can be used to verify that the user is the correct user to be submitting the credentials in question.

The current biometric obtained by the mobile device 604 can be transmitted to the service provider 606. The service provider 606 can evaluate the data extracted from the NFC chip 610 and confirm the identity of the user. As noted above, this can include using a current biometric, in some embodiments.

The service provider 606 can also validate that the data stored on the NFC chip 610 has not been tampered with. This can include examining a hash string of data stored on the NFC chip 610 to ensure data consistency. When the service provider 606 verifies the identity of the owner of the ID document 602 and the validity of the NFC chip 610, the service provider 606 can generate a user identity packet 618. As noted above, the user identity packet 618 serves as a self-sovereign identity for the user that can be used in place of the data stored on the NFC chip 610 of the ID document 602. The SSI is augmented with the validation of the NFC chip 610, which can (as noted herein) create an unbroken chain of trust. The user identity packet as described herein can include the SSI that is backed by validation of the NFC chip.

Transactions which would normally require presentation of the ID document 602 and extraction of data from the NFC chip 610 can now be conducted using the user identity packet 618 (NFC chip validation, augmented SSI). In some embodiments, the service provider 606 encrypts the user identity packet 618.

The service provider 606 transmits the user identity packet 618 to the mobile device 604 for storage locally on the mobile device 604. The user identity packet 618 can be stored locally in memory 620 of the mobile device 604. To be sure, the mobile device 604 can include a processor 622 that can execute instructions stored in memory 620 such as the application 614.

Once the user identity packet 618 is stored locally on the mobile device 604, a requesting device or service 624 can transmit to the mobile device 604 a request for ID data 626. The request for ID data 626 can include a request for the data that is stored on the NFC chip 610 of the ID document 602. Rather than requiring the user to provide the ID document 602 and have the data read from the NFC chip 610, the mobile device 604 can transmit the user identity packet 618 in place of the data stored on the NFC chip 610. The data include in the user identity packet 618 includes not only data regarding the user, but also a verification of the identity of the user. Thus, the requesting device or service 624 need not independently verify the identity of the user and/or the validity of the NFC chip 610 or ID document 602, but can rely on the user identity packet 618 as sufficient verification/validity. To be sure, the requesting device or service 624 should be configured to accept the user identity packet 618 in lieu of the data on the NFC chip 610.

Advantageously, the user can be alleviated from having to resubmit their ID document 602 each and every time their identity needs to be confirmed. The user submits their identity and has it verified one time, prior to the creation of the user identity packet 618. Once the user identity packet 618 is stored locally on the mobile device 604 the user need not re-verify or re-authorize their identity again, unless the user obtains a new mobile device.

Additionally, the storage of the user identity packet 618 on the mobile device 604 effectively and logically links the ID document 602 to the mobile device 604. When a selfie or photograph is used to verify that the user who is operating the mobile device 604 is associated with the ID document 602, the image of the user can be linked to the mobile device 604 and ID document 602. Again, some embodiments do not require the use of a selfie or photograph to enable creation and storage of the user identity packet 618, but in situations where the selfie or photograph is used, this ensures that the mobile device being accessed by the person is also associated with the identity stored on the ID document.

In some embodiments, the ID document 602 can be linked with the mobile device 604 by comparing a device identifier with expected or stored information that identifies the mobile device 604. For example, the service provider [604] 606 can determine that an IMEI (International Mobile Equipment Identity) number obtained from the mobile device 604 matches a stored IMEI number for the owner. For example, the stored IMEI can be obtained initially when an owner of the ID document 602 initially registers or provides ownership/identity information to obtain their ID document 602 from an issuing authority. In some embodiments, the IMEI could be read from the mobile device 604 using any known method and compared with prior IMEI information that was obtained at a prior point in time when data was read from the NFC chip 610. To be sure, while an IMEI number has been described, any other data that can be used to uniquely identify a computing device can be used.

According to some embodiments, a second type of document can be used as another authenticating factor. Thus, in addition to processing an ID document having an NFC chip as disclosed herein. In a second, related process, data can be obtained from an RFID (or even a second NFC) chip of from another identity document. The data obtained from the RFID chip can be compared with the data obtained from the NFC chip.

Even if a fraudster were able to tamper with an NFC chip for one document it would be far more difficult to tamper with results from two separate documents with different data. One document might be a passport—if a fraudster found a way to fake NFC data and they know what elements are on a passport. If a second NFC document were used during the validation process and creation of the SSI the fraudster would not know what type of document was used (credit card, driver's license, etc.) and would not know how to fake that data. This process could function having two factors of identity authentication, one from the first document and another factor from the second document.

Figure 7:
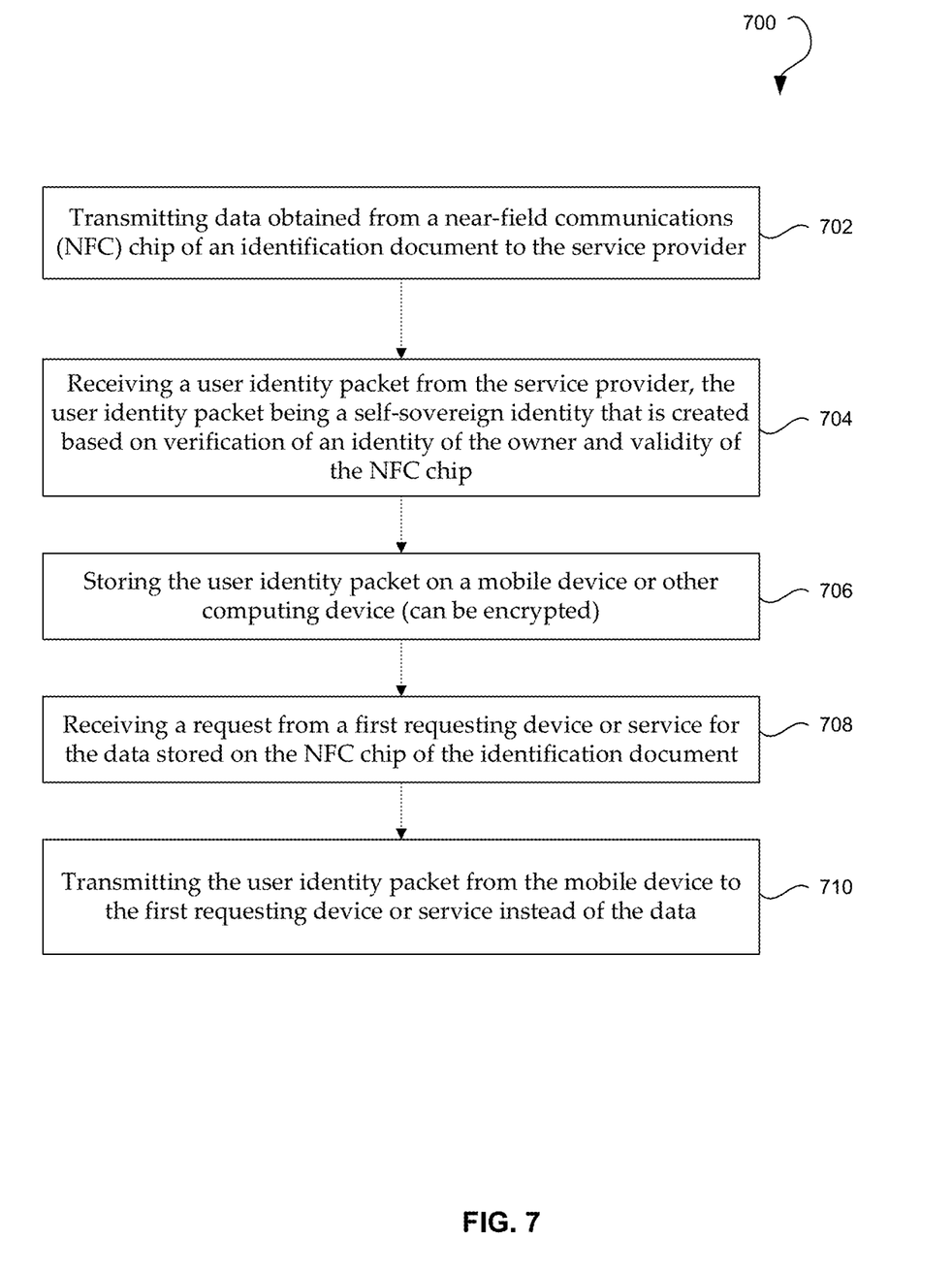
FIG. 7 is a flowchart of an example method of the present disclosure.

FIG. 7 is a flowchart of an example method 700 of the present disclosure that can be executed by a mobile device or other communication device as disclosed herein. The method includes a step 702 of transmitting data obtained from a near-field communications (NFC) chip of an object such as an identification document to the service provider. As noted above, the data can include identifying information for an owner of the identification document.

Next, the method can include a step 704 of receiving a user identity packet from the service provider. The user identity packet is generated by a service provider based on verification of an identity of the owner and validity of the NFC chip by the service provider.

In some instances, the method includes a step 706 of storing the user identity packet on a mobile device, as well as a step 708 of receiving a request from a first requesting device or service for the data stored on the NFC chip of the identification document. In some embodiments, the method includes a step 710 of transmitting the user identity packet from the mobile device to the first requesting device or service instead of the data. As noted below, the data that are transmitted from the user identity packet can be all, or only part of the data included in the user identity packet (NFC-backed SSI). For example, the requesting service/device (or even the user) can request only portions of the SSI for transmission. If the SSI stores name, address, date-of-birth, gender, photo, biometric, and so forth, the service may only need the name and date-of-birth. In this instance, the subset of the name and date-of-birth would be transmitted.

Figure 8:
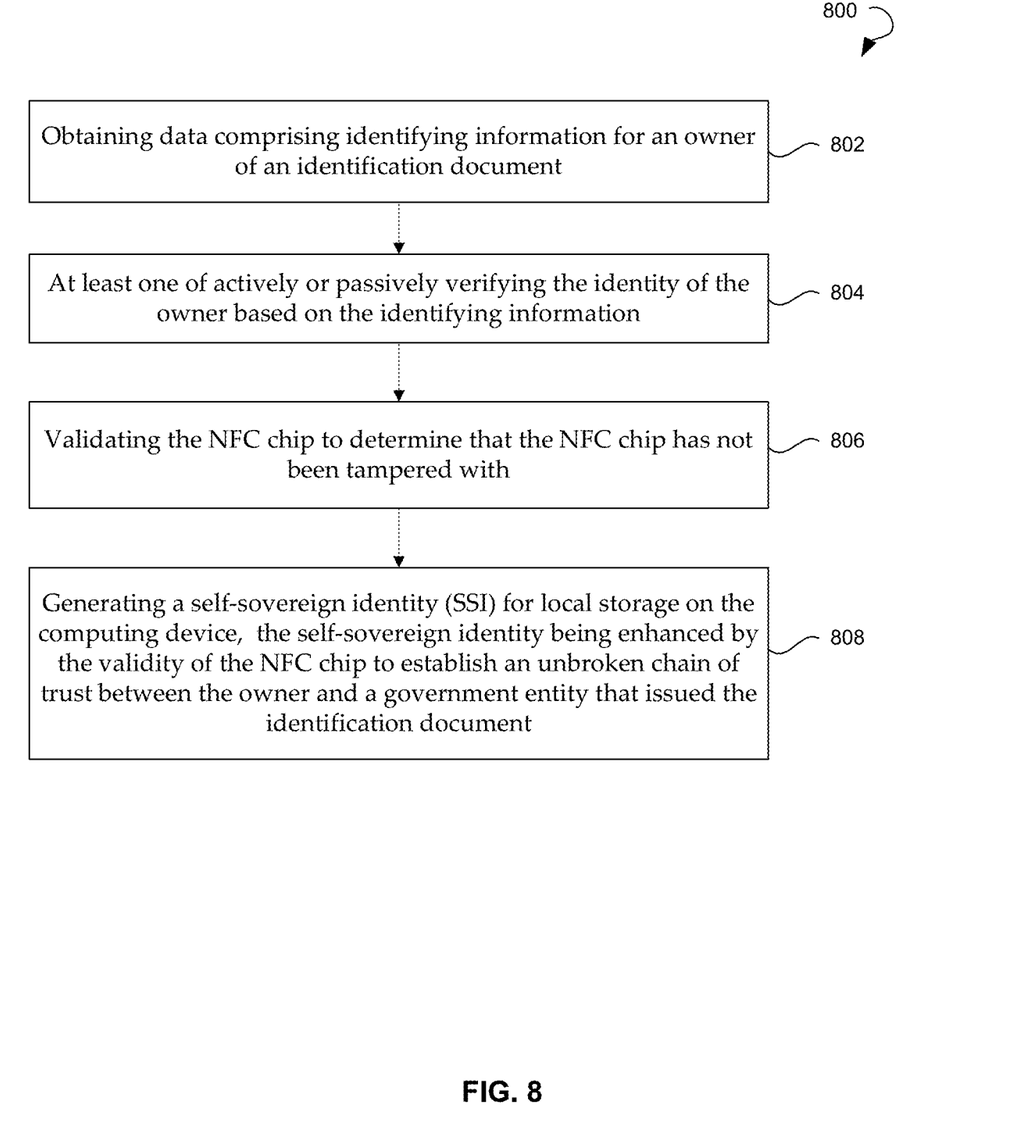
FIG. 8 is a flowchart of another example method of the present disclosure.

FIG. 8 is a flowchart of another example method 800 that can be performed by a service provider of the present disclosure. The method can include a step 802 of obtaining data comprising identifying information for an owner of an identification document. To be sure, the data were obtained from a near-field communications (NFC) chip by a mobile device.

The method can include a step 804 of at least one of actively or passively verifying the identity of the owner based on the identifying information. For example, the owner can provide credentials to access the identifying information. In another example, the owner can take a selfie that can be compared to an image of the owner that has been previously stored.

The method can include a step 806 of validating the NFC chip to determine that the NFC chip has not been tampered with. The validity of the NFC chip can include examining the signing certificate or other data stored on the NFC chip to determine if the data has been (or appears to have been) tampered with.

The method can include a step 808 of generating a self-sovereign identity (SSI) for local storage on the computing device, the self-sovereign identity being enhanced by the validity of the NFC chip to establish an unbroken chain of trust between the owner and a government entity that issued the identification document.

In various embodiments, the self-sovereign identity is provided to a first requesting device or service instead of the data stored on the NFC chip after the first requesting device or service has requested the data of the identification document. In some embodiments, the SSI is encrypted prior to being transmitted to the mobile device.

In various embodiments, the method can include a step of transmitting the SSI for local storage on the mobile device. In some embodiments, the SSI may be provided to a first requesting device or service instead of the data stored on the NFC chip after the first requesting device or service has requested the data of the identification document.

The service provider can also be configured to execute method steps such as receiving an image of the identification document by the service provider from a mobile device and confirming presence of the identification document based on the image. Example methods can further include receiving a photograph of a user of the mobile device and confirming the user by comparing the photograph of the user to a stored image of the user using facial recognition. When the image matches the stored image, the mobile device can be linked to the identity document based on the user identity packet. In some embodiments, the mobile device can be linked to the identification document using a unique identifier, such as an IMEI number for the mobile device.

While some embodiments contemplate the provision of the user identity packet to a first requesting device or service by the mobile device, the mobile device could instruct the service provider to transmit the user identity packet to the first requesting device or service. Thus, in some instances, the user identity packet need not always be stored on the mobile device. In some embodiments, the user identity packet can be stored both locally on the mobile device and at the service provider level.

In various embodiments, the method can include steps such as receiving a request from a second requesting device or service for the data of the identification document, as well as a step of transmitting the user identity packet to a second requesting device or service without having to re-verify the identity of the user. That is, both the first requesting device or service and the second requesting device or service each receives the user identity packet. No reverification of the ID of the user is needed for either of these requests. In each instance, the user identity packet is provided in response to any request for data from the ID document.

As noted above, the method can include logically linking the identity document with the mobile device of the user. Logical linking can include obtaining a photograph of the user using the mobile device, as well as confirming the user by comparing the photograph of the user to a stored image of the user using facial recognition. In some embodiments, when the image matches the stored image, the mobile device can be linked to the identity document based on the user identity packet.

According to some embodiments, the owner of the identification document can choose for only portions of information stored on the NFC chip or in the SSI to be shared with a requesting device or service. For example, the owner may wish to share only certain pertinent portions of the information stored in the SSI on their mobile device with a first merchant, such as a name, phone number, and a portion of their social security number. In another example, the owner may wish to share only certain pertinent portions of the information stored in the encrypted SSI on their mobile device with a second merchant, such as their date of birth and address.

The owner may be given visibility into types of identifying information stored in their SSI. The mobile device can execute an application (see application 614 of FIG. 6) that allows the user to select which types of identifying information stored in their SSI are provided on a per-transaction basis, or based on the merchant/service/device that has requested the identifying information. For example, the owner can select that the first merchant always receives at least the name, phone number, and a portion of their social security number.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as a client device, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, DVD, any other optical medium, any other physical medium with patterns of marks or holes, a RAM, a Programmable Read-Only Memory (PROM), an Erasable Programmable Read-Only Memory (EPROM), an Electrically Erasable Programmable Read-Only Memory (EEPROM), a FlashEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present technology has been presented for purposes of illustration and description, but is not intended to be exhaustive or limited to the disclosure. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

Aspects of the present technology are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, computer-implemented methods and systems for identification document verification are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. An identification (ID) verification method, comprising:
obtaining a photograph of an identification document that comprises a near-field communications (NFC) chip, the identification document comprising printed data that is captured in the photograph;
receiving, from a server, the printed data extracted from the photograph via optical character recognition;
verifying an authenticity of the identification document from the photograph;
unlocking the NFC chip using the printed data;
extracting data from the NFC chip;
validating the NFC chip from the data;
obtaining current identity data of information identifying a user of a device;
obtaining baseline identity data from the near-field communications (NFC) chip, the baseline identity data comprising information identifying an owner of the identification document at a time of issuance of the identification document to the owner or at a time the owner first obtains the document;
comparing the current identity data with the baseline identity data to verify whether the owner of the identification document is a correct user of the document;
providing a user identity packet once the authenticity of the document has been verified, the NFC chip has been validated and the owner of the identification document has been verified as the correct user of the identification document, wherein the user identity packet is a self-sovereign identification (SSI) augmented with an indication that the NFC has been validated;
storing the user identity packet in a memory of the device and thereby linking the identification identification document to the user's device;
receiving a request from a first requesting device or service for identity information of the owner of the identification document; and
transmitting at least part of the user identity packet from the user's device to the first requesting device or the service in response to the request, wherein an unbroken chain of trust is established between the user and an entity that issued the identification document.

2. The method according to claim 1, further comprising:
receiving a request from a second requesting device or a service for the identity information; and
transmitting the user identity packet to the second requesting device or the service without having to re-verify whether the owner of the identification document is a correct user of the identification document and without having to re-verify the authenticity of the identification document.

3. The method according to claim 1, further comprising associating the user's device with the identification document using device identifying information for the user's device.

4. The method according to claim 1, wherein validating the NFC chip comprises performing a hardware check of the NFC chip using a public key for the NFC chip, the hardware check validating that the NFC chip has not been tampered with.

5. The method according to claim 1, further comprising providing instructions on the user's device to direct the user as to how to obtain the baseline identity data from the NFC chip.

6. The method according to claim 1, further comprising encrypting the self-sovereign identification.

7. The method according to claim 1, wherein validating the NFC chip comprises performing a hardware check of the NFC chip, the NFC chip comprising a country signing certificate.

8. The method according to claim 1, wherein the identification document is a document issued by a government.

9. The method according to claim 1, wherein the user selects only a portion of identifying information that is stored on the NFC chip as part of the SSI that is transmitted to the first requesting device or service.

10. The method according to claim 1, wherein the device is a mobile device that is linked to the identification document using an IMEI number for the mobile device.

11. A device, comprising:
a processor;
a near-field communications (NFC) reader;
a camera;
a communications module; and
a memory storing instructions, the processor operatively connected to the memory and to the communications module, and configured to execute the instructions to:
prompt a user of the device to operate the camera to obtain a photograph of an identification document that comprises a near-field communications (NFC) chip, the identification document comprising printed data that is captured in the photograph;
receive, from a server, the printed data extracted from the photograph via optical character recognition;
unlock the NFC chip using the printed data;
extract data from the NFC chip using the NFC reader;
receive an indication of a verification of the identification document, the identification document having been verified using the photograph of the identification document and the data extracted from the NFC chip using the NFC reader;
receive an indication that the NFC chip has been validated using the data extracted from the NFC chip;
obtain current identity data of information identifying the user of the device;
obtain baseline identity data from the NFC chip, the baseline identity data comprising information identifying an owner of the identification document at a time of issuance of the identification document to the owner or at a time the owner first obtains the identification document;
control the communications module to transmit the current identity data to a service provider for comparison with the baseline identity data to verify whether the owner of the identification document is a correct user of the identification document;
control the communications module to receive a user identity packet from the service provider once authenticity of the identification document has been verified, the NFC chip has been validated and the owner of the document has been verified as the correct user of the document, the user identity packet being a self-sovereign identification (SSI) augmented with an indication that the NFC chip has been validated;
store the user identity packet locally in the memory and thereby link the identification document to the device;
receive a request from a first requesting device or a service for proof of ID verification of the owner of the identification document; and
control the communications module, upon receipt of the request from the first requesting device or the service, to transmit at least part of the stored user identity packet from the device to the first requesting device or service, wherein an unbroken chain of trust is created between the user and an entity that issued the identification document.

12. The device according to claim 11, wherein the processor is configured to execute the instructions to:
receive a request from a second requesting device or a service for proof of ID verification of the owner of the identification document; and
control the communications module, upon receipt of the request from the second requesting device or the service, to transmit the user identity packet to the second requesting device or service without having to re-verify the identity of the user.

13. The device according to claim 11, further comprising logically linking the device to the identification document with device identifying information.

14. The device according to claim 11, wherein the processor is configured to allow the user to select only a portion of the data that is stored on the NFC chip as part of the SSI that is transmitted to the first requesting device or the service.

15. The device according to claim 11, wherein the device is a mobile device that is linked to the identification document using an IMEI number for the mobile device.

16. The device according to claim 11, wherein the processor of the device is a first processor, and further comprising a second processor disposed in a network with the device so as to be in communication with the communications module of the device, and configured to provide the user identity packet once the authenticity of the identification document has been verified, the NFC chip has been validated and the owner of the identification document has been verified as the correct user of the identification document, and to transmit the user identity packet to the device for storage in the memory of the device.

17. A computer-implemented method for identification (ID) verification using a device with embedded near-field communications (NFC) functionality, the method comprising:
capturing, by a camera associated with a client device, an image of an ID document and a photo of a user;
confirming physical presence of the ID document;
transmitting, by the client device, the image of the ID document and the photo of the user to a server;
retrieving, by the server via optical character recognition (OCR) technology, printed data of the ID document from the image;
comparing, by the server via facial recognition, the photo of the user to a stored image of the user;
receiving, by the client device, the printed data associated with the ID document from the server;
unlocking an NFC chip using the printed data received from the server, wherein unlocking the NFC chip with the printed data indicates the NFC has been validated;
retrieving digital data from the NFC chip using an NFC reader;
sending, by the client device, the digital data retrieved from the NFC chip to the server;
comparing, by the server, the digital data from the NFC chip with the printed data associated with the ID document to verify authenticity of the ID document;
obtaining, by the client device, current identity data of information identifying the user of the client device;
obtaining baseline identity data from the NFC chip, the baseline identity data comprising information identifying an owner of the ID document at a time of issuance of the ID document to the owner or at a time the owner first obtained the ID document;
comparing, by the server, the current identity data with the baseline identity data to verify whether the owner of the ID document is the correct user of the ID document;
generating a user identity packet, which is a self-sovereign ID, after:
the authenticity of the ID document has been verified,
validation of the NFC chip via unlocking, and
verification of the owner of the ID document as the correct user of the ID document;
providing, by the server to the client device, the user identity packet;
storing the user identity packet in an encrypted form in a memory of the client device, thereby linking the ID document to the client device and ensuring data security and integrity;
receiving, by the client device, a request from a first requesting device or service for identity information of the owner of the ID document; and
transmitting, by the client device, at least part of the user identity packet to the first requesting device or the service in response to the request, wherein an unbroken chain of trust is established between the user and an entity that issued the ID document, utilizing secure data transmission protocols.

* * * * *

UNITED STATES PATENT AND TRADEMARK OFFICE
CERTIFICATE OF CORRECTION

PATENT NO. : 12,198,215 B2
APPLICATION NO. : 16/917776
DATED : January 14, 2025
INVENTOR(S) : Sanjay Gupta et al.

Page 1 of 1

It is certified that error appears in the above-identified patent and that said Letters Patent is hereby corrected as shown below:

In the Specification

In Column 10, Lines 30-31, the phrase "For example, the service provider [604] 606 can determine" should be replaced with the phrase "For example, the service provider 606 can determine".

In Column 15, Lines 22 and 25, regarding Claim 1, the word "document" should be replaced with the phrase "identification document."

Signed and Sealed this
Twenty-seventh Day of May, 2025

Coke Morgan Stewart
*Acting Director of the United States Patent and Trademark Office*